(12) United States Patent
Kamoda et al.

(10) Patent No.: US 11,459,040 B2
(45) Date of Patent: Oct. 4, 2022

(54) WORK VEHICLE

(71) Applicant: Iseki & Co., LTD, Ehime-ken (JP)

(72) Inventors: Hiroshi Kamoda, Ehime-ken (JP); Itsuki Doi, Ehime-ken (JP); Yutaka Kajino, Ehime-ken (JP); Akihiro Machida, Ehime-ken (JP); Seiji Tanaka, Ehime-ken (JP); Shiro Ito, Ehime-ken (JP)

(73) Assignee: ISEKI & CO., LTD., Ehime-Ken (JP)

( * ) Notice: Subject to any disclaimer, the term of this patent is extended or adjusted under 35 U.S.C. 154(b) by 432 days.

(21) Appl. No.: 16/664,388

(22) Filed: Oct. 25, 2019

(65) Prior Publication Data

US 2020/0130758 A1 Apr. 30, 2020

(30) Foreign Application Priority Data

Oct. 26, 2018 (JP) .............................. JP2018-202279

(51) Int. Cl.
*B62D 49/08* (2006.01)
*G01S 15/86* (2020.01)
*B62D 49/06* (2006.01)
*G01S 15/931* (2020.01)

(52) U.S. Cl.
CPC ....... *B62D 49/085* (2013.01); *B62D 49/0628* (2013.01); *G01S 15/86* (2020.01); *G01S 15/931* (2013.01); *B62D 49/06* (2013.01); *G01S 2015/937* (2013.01)

(58) Field of Classification Search
CPC ....... B60W 2300/152; B60W 2420/40; B60W 2420/54; B60Y 2200/221; B62D 49/085; B62D 49/0628; G01S 15/86; G01S 15/931; G01S 17/931; G01S 13/931; G01S 2015/9327; G01S 2015/937; G01S 2015/938; B60R 21/0134
See application file for complete search history.

(56) References Cited

U.S. PATENT DOCUMENTS

| 10,302,744 B1* | 5/2019 | Krishnan ................ B60R 11/04 |
| 2008/0133136 A1* | 6/2008 | Breed ..................... G01S 19/17 |
| | | 340/901 |
| 2013/0250732 A1* | 9/2013 | Tsuji ..................... B60R 19/483 |
| | | 367/173 |

(Continued)

FOREIGN PATENT DOCUMENTS

| CN | 107433914 A | * 12/2017 | ............. B60R 11/00 |
| EP | 3837961 A1 | * 6/2021 | ........... A01B 69/004 |

(Continued)

OTHER PUBLICATIONS

Sawada, Radar Device Mounting Structure, Dec. 5, 2017, EPO, CN 107433914 A, Machine Translation of Description (Year: 2017).*

*Primary Examiner* — James A English
*Assistant Examiner* — Matthew D Lee
(74) *Attorney, Agent, or Firm* — Finnegan, Henderson, Farabow, Garrett & Dunner LLP

(57) ABSTRACT

Provided is a work vehicle having an improved obstacle detection accuracy. The work vehicle includes: a bonnet provided on a front portion of a travelling vehicle body; an obstacle sensor that detects an obstacle on a front side; and a sensor attaching stay configured to extend toward a front side of the bonnet and to allow the obstacle sensor to be attached thereto.

11 Claims, 9 Drawing Sheets

(56) References Cited

U.S. PATENT DOCUMENTS

| | | | | |
|---|---|---|---|---|
| 2017/0305481 A1* | 10/2017 | Smith | ................ | B62D 49/0628 |
| 2017/0315231 A1* | 11/2017 | Wodrich | ................. | G01S 13/87 |
| 2018/0086280 A1* | 3/2018 | Nguyen | ............... | G01S 17/931 |
| 2019/0163190 A1* | 5/2019 | Ono | ..................... | G05D 1/0214 |
| 2019/0382005 A1* | 12/2019 | Nishi | ................... | A01B 69/008 |
| 2020/0130601 A1* | 4/2020 | Kamoda | ................ | B60R 11/00 |
| 2020/0189487 A1* | 6/2020 | McKendrick | ......... | G01S 17/931 |
| 2021/0120728 A1* | 4/2021 | Nishikubo | ............. | G01S 7/481 |
| 2021/0124365 A1* | 4/2021 | Nishikubo | ............ | G05D 1/024 |

FOREIGN PATENT DOCUMENTS

| | | | | | |
|---|---|---|---|---|---|
| JP | 2005077130 A | * | 3/2005 | ............... | G01C 3/18 |
| JP | 2017-161987 A | | 9/2017 | | |
| KR | 1020210050054 A | * | 5/2021 | ............ | B60K 31/00 |
| KR | 1020220007115 A | * | 1/2022 | ............ | A01B 69/00 |

* cited by examiner

WORK VEHICLE

CROSS REFERENCE TO RELATED APPLICATIONS

This application claims priority to Japanese Patent Application No. 2018-222797, filed Nov. 28, 2018, the disclosure of which is incorporated herein by reference in its entirety.

BACKGROUND

The present disclosure relates to a work vehicle.

Conventionally, for work vehicles, such as an agricultural tractor, a configuration has been known, in which a front portion of a travelling vehicle body thereof is provided with an obstacle sensor for detecting presence of an obstacle in front of the travelling vehicle body and in turn detecting a location of the obstacle, a shape of the obstacle or the like (see, e.g., Japanese Patent Application Pub. No. JP-A-2017-161987).

SUMMARY

An object of some embodiments of the present disclosure is to provide a work vehicle, which can improve obstacle detection accuracy.

In order to address the above technical concerns and to achieve the above object, a first aspect of the present disclosure provides a work vehicle including:

a bonnet (6) provided on a front portion of a travelling vehicle body (2);

an obstacle sensor (20) that detects an obstacle on a front side; and a sensor attaching stay (30) configured to extend toward a front side of the bonnet (6) and to allow the obstacle sensor (20) to be attached thereto.

According to such features, the obstacle sensor can be provided at a location where the obstacle sensor is hardly influenced by vibration of the bonnet, thereby improving the obstacle detection accuracy.

A second aspect of the present disclosure provides the work vehicle according to the first aspect, in which the sensor attaching stay (30) includes a bracket portion (31) having arm portions (312) extending in a left and right direction, and the obstacle sensor (20) is provided on each of the left and right arm portions (312).

According to such features, a detection range of the obstacle sensor can be expanded.

A third aspect of the present disclosure provides the work vehicle according to the second aspect, in which the bracket portion (31) has a body portion (311) at a center portion in the left and right direction and has the arm portions (312) extending from the body portion (311) in the left and right direction, a first sensor (21) that detects an obstacle is provided on the body portion (311), and a second sensor (22) that detects an obstacle at a distance shorter than a detection range of the first sensor (21) is provided on each of the arm portions (312).

According to such features, the detection range of the obstacle sensor can be expanded.

A fourth aspect of the present disclosure provides the work vehicle according to the third aspect, in which the first sensor (21) is an infrared sensor configured to detect an obstacle by applying an infrared beam; and the second sensor (22) is an ultrasonic sensor configured to detect an obstacle by emitting ultrasonic waves.

According to the features, the detection range of the obstacle sensor can be expanded.

A fifth aspect of the present disclosure provides the work vehicle according to any one of the first to fourth aspects, in which a weight attachment unit (13) is provided on the front portion of the travelling vehicle body (1) and configured such that a weight (14) can be attached thereto in order to maintain a weight balance of the vehicle body; and the obstacle sensor (20) is positioned above the weight (14).

According to the features, the weight 14 can be used while the obstacle sensor is attached, so that the work machine W can be used even when required to carry the weight 14, which expands the range of use of the work machine W.

A sixth aspect of the present invention provides the work vehicle according to any one of the first to fourth aspects, in which a weight attachment unit (13) is provided on the front portion of the travelling vehicle body (2) and configured such that a weight (14) can be attached thereto in order to maintain a weight balance of the vehicle body; and the obstacle sensor (20) is positioned in front of a rear end of the weight (14).

According to such features, detection by the obstacle sensor is hardly disturbed by the weight, which improves the obstacle detection accuracy.

According to some embodiments of the present disclosure, there can be provided a work vehicle having an improved obstacle detection accuracy. Objects and advantages of the disclosed embodiments may be realized and attained by the elements and combinations that may be set forth in the claims. However, embodiments of the present disclosure are not necessarily required to achieve such exemplary objects and advantages, and some embodiments may not achieve any of the objects and advantages discussed above.

DESCRIPTION OF EXEMPLARY EMBODIMENTS

Now, embodiments of a work vehicle disclosed herein will be described in detail with reference to the accompanying drawings. Meanwhile, the present invention is not limited to the embodiments as described below.

General Configuration of Work Vehicle (Tractor) 1.

Figure 1:
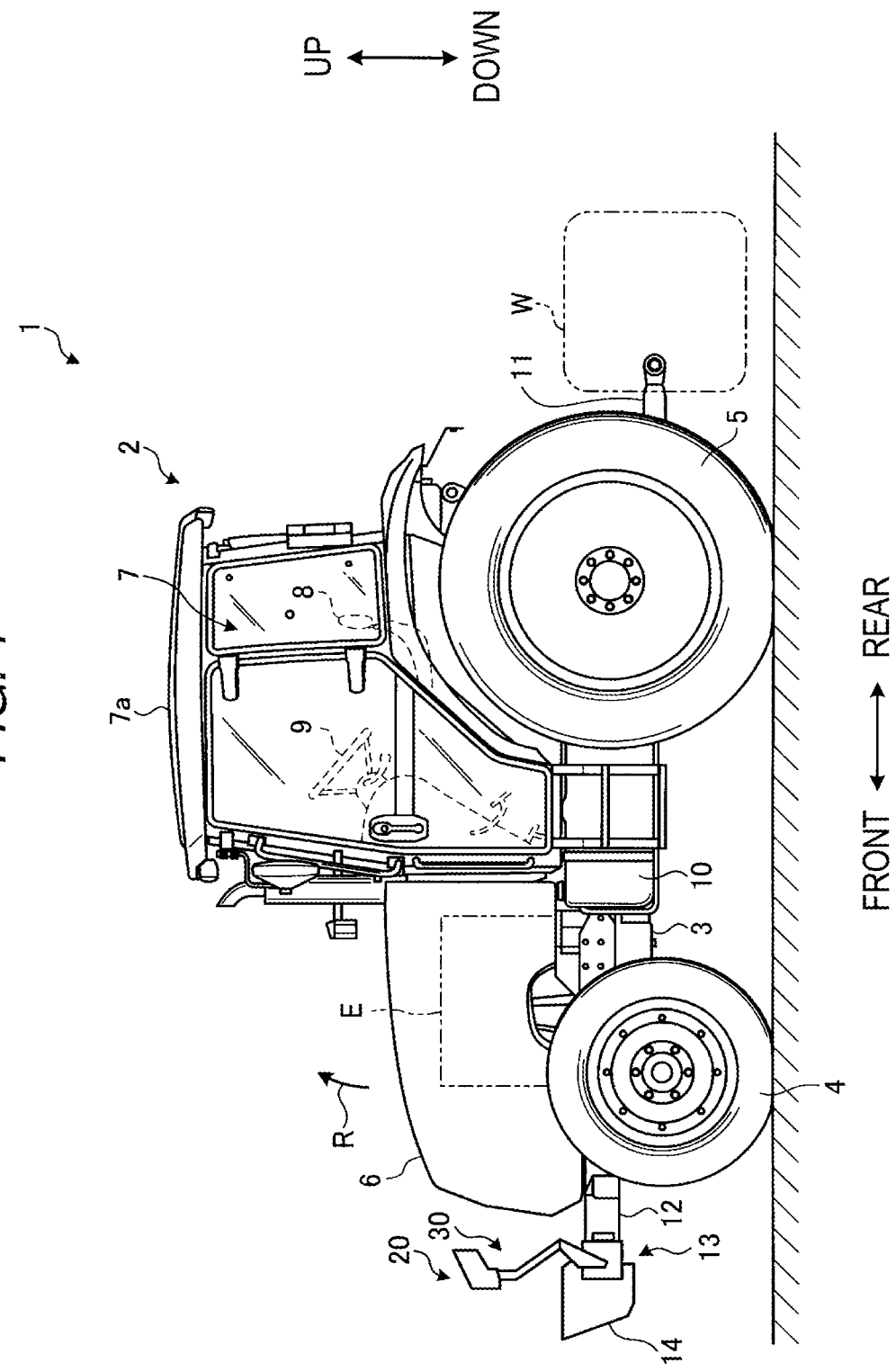
FIG. 1 is an explanatory view of a work vehicle according to an embodiment.

First, a general configuration of a work vehicle 1 will be described with reference to FIG. 1. FIG. 1 is an explanatory view of the work vehicle 1 according to an embodiment, which is a schematic left side view of the work vehicle 1. Meanwhile, in the following, a tractor will be described as an example of the work vehicle 1. The tractor 1, which is the work vehicle, is an agricultural tractor which is intended to perform work on a farm field or the like while being self-propelled.

Further, in the following, a front and rear direction is a travelling direction of the tractor 1 during straight travel, and a front side of the travelling direction is defined as "front" and a rear side thereof is defined as "rear". The travelling direction of the tractor 1 is a direction from an operator seat 8 (as described below) toward a steering wheel 9 during straight travel (see FIG. 1).

A left and right direction is a direction horizontally perpendicular to the front and rear direction. In the following, left and right are defined toward the "front" side. That is, in a state where an operator (also referred to as a worker) of the tractor 1 sits on the operator seat 8 toward the front side, the left hand side is defined as "left" and the right hand side is defined as "right".

An upward and downward direction is a vertical direction. The front and rear direction, the left and right direction and the upward and downward direction are perpendicular to each other. Meanwhile, the directions are defined for the sake of convenience of explanation, and accordingly, the present invention is not limited to the directions. Further, in the following, the tractor 1 is also referred to as a "machine body".

As shown in FIG. 1, the tractor 1 includes a travelling vehicle body 2 and a work machine W. The travelling vehicle body 2 has a vehicle body frame 3, front wheels 4, rear wheels 5, a bonnet 6, an engine E, a cockpit 7 and a transmission case 10. The vehicle body frame 3 is a main frame of the travelling vehicle body 2.

The front wheels 4 include a pair of left and right wheels and are mostly wheels for steering, i.e., steered wheels. The rear wheels 5 include a pair of left and right wheels and are mostly wheels for driving, i.e., driving wheels. The tractor 1 may be configured to be convertible between a two-wheel drive (2WD), in which the rear wheels 5 are driven, and a four-wheel drive (4WD), in which both the front wheels 4 and the rear wheels 5 are driven. In this case, both the front wheels 4 and the rear wheels 5 are driving wheels.

The bonnet 6 is provided on a front portion of the travelling vehicle body 2 to be opened and closed. The bonnet 6 can be pivoted (e.g., opened and closed) about a rear portion thereof as a pivot center in the upward and downward direction, as shown by an arrow R in the figures. Also, in the closed state, the bonnet 6 covers the engine E mounted on the vehicle body frame 3. The engine E as a driving source for the tractor 1 is a heat engine, such as a diesel engine or a gasoline engine.

The cockpit 7 is provided on an upper portion of the travelling vehicle body 2 and includes an operator seat 8, a steering wheel 9 and so on. Additionally, the cockpit 7 may be formed to be covered with a cabin 7a provided on the upper portion of the travelling vehicle body 2. The operator seat 8 is a seat for an operator. The steering wheel 9 is operated by the operator when steering the front wheels 4, which are steered wheels. In addition, the cockpit 7 has a display unit (meter panel) for displaying various information in front of the steering wheel 9.

Further, the cockpit 7 includes various operation levers, such as a forward/reverse lever, an accelerator lever, a main shift lever and a sub-shift lever, and various operation pedals, such as an accelerator pedal, a brake pedal and a clutch pedal.

The transmission case 10 houses a transmission (speed-changing mechanism) therein. The transmission is configured to properly reduce a speed of a power (rotational power) transferred from the engine E and then to transfer the power to the rear wheels 5, which are driving wheels, or to a PTO (Power Take-off) shaft 11 as described below.

The PTO shaft 11 protrudes rearward from the transmission case 10. The PTO shaft 11 is configured to transfer the rotational power, of which a speed is properly reduced by the transmission, to the work machine W mounted on at least a rear portion of the travelling vehicle body 2. The work machine W is a machine for performing work on a farm field and is, for example, a rotary tiller for performing tillage work or a fertilizer applicator for performing fertilization work.

Further, the tractor 1 has a weight attachment unit 13. The weight attachment unit 13 is provided in front of a front bumper 12 of the travelling vehicle body 2. For example, the weight attachment unit 13 is provided on the front end of the travelling vehicle body 2. The weight attachment unit 13 is configured such that a weight 14 can be attached thereto in order to balance front and rear weights of the tractor 1 with the work machine W mounted on the rear portion of the travelling vehicle body 2. Meanwhile, the details of the weight attachment unit 13 will be described below with reference to FIGS. 2 to 4B.

Also, the tractor 1 further includes an obstacle sensor 20 and a sensor attaching stay 30. The obstacle sensor 20 is configured to detect an obstacle present in front of the tractor 1. The obstacle sensor 20 is attached to the sensor attaching stay 30. The sensor attaching stay 30 is configured such that when the obstacle sensor 20 is attached thereto, the obstacle sensor 20 can be positioned in front of a rear end of the weight 14 attached to the weight attachment unit 13. Meanwhile, the details of the obstacle sensor 20 and the sensor attaching stay 30 will be described below with reference to FIGS. 2 to 4B.

Weight Attachment Unit 13.

Figure 2:
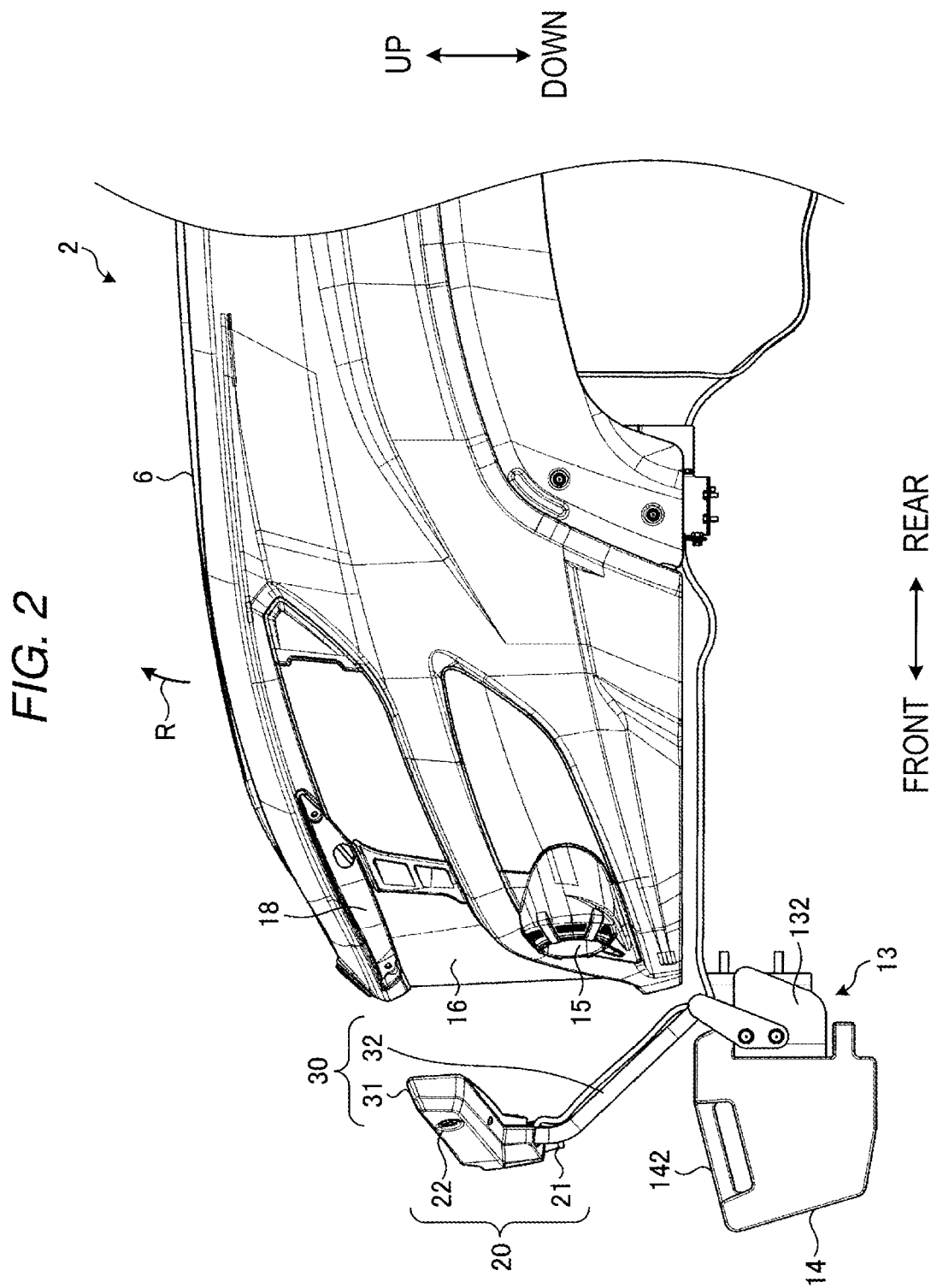
FIG. 2 is a left side view showing a front portion of a travelling vehicle body.
Figure 3:
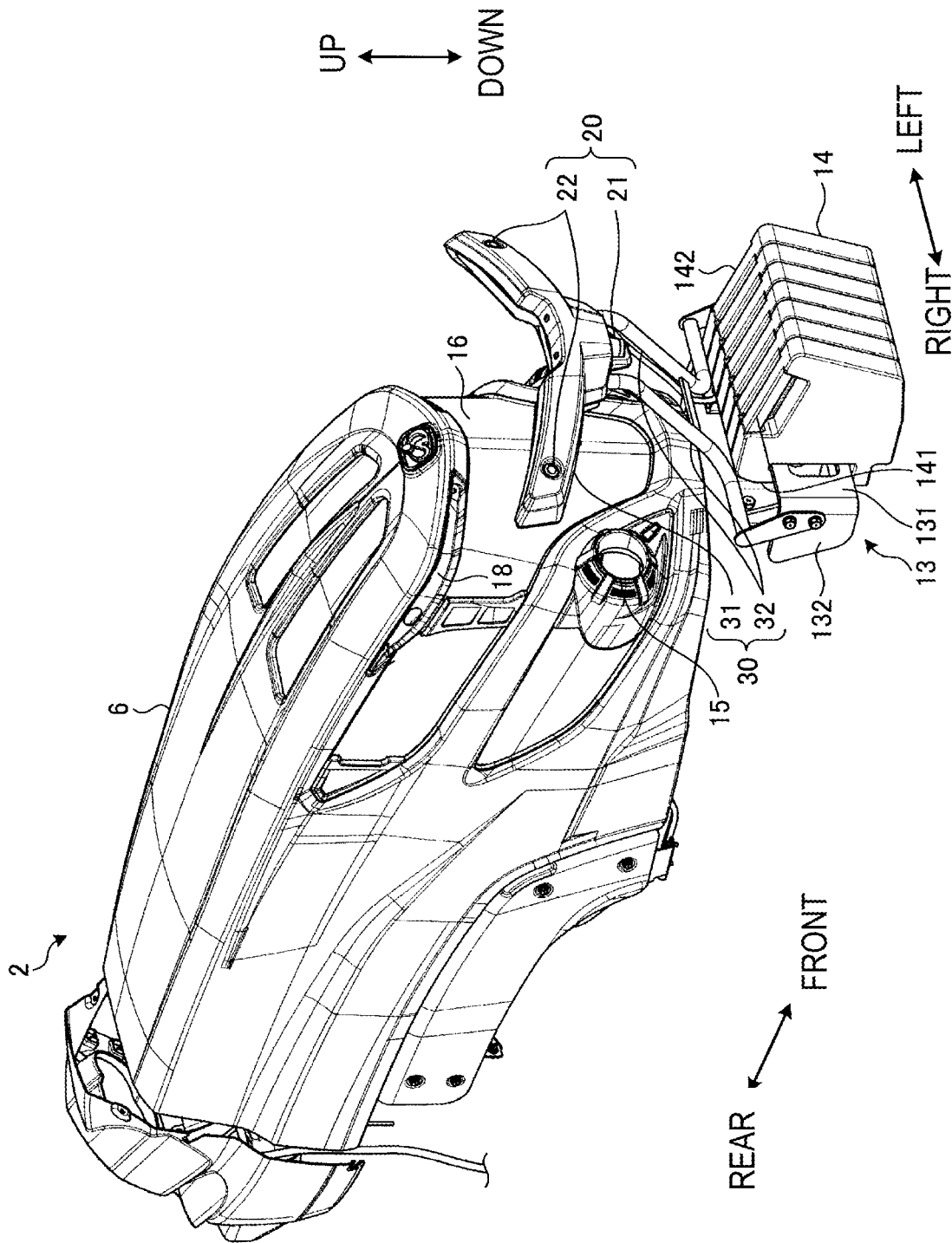
FIG. 3 is a perspective view showing the front portion of the travelling vehicle body.
Figure 4A:
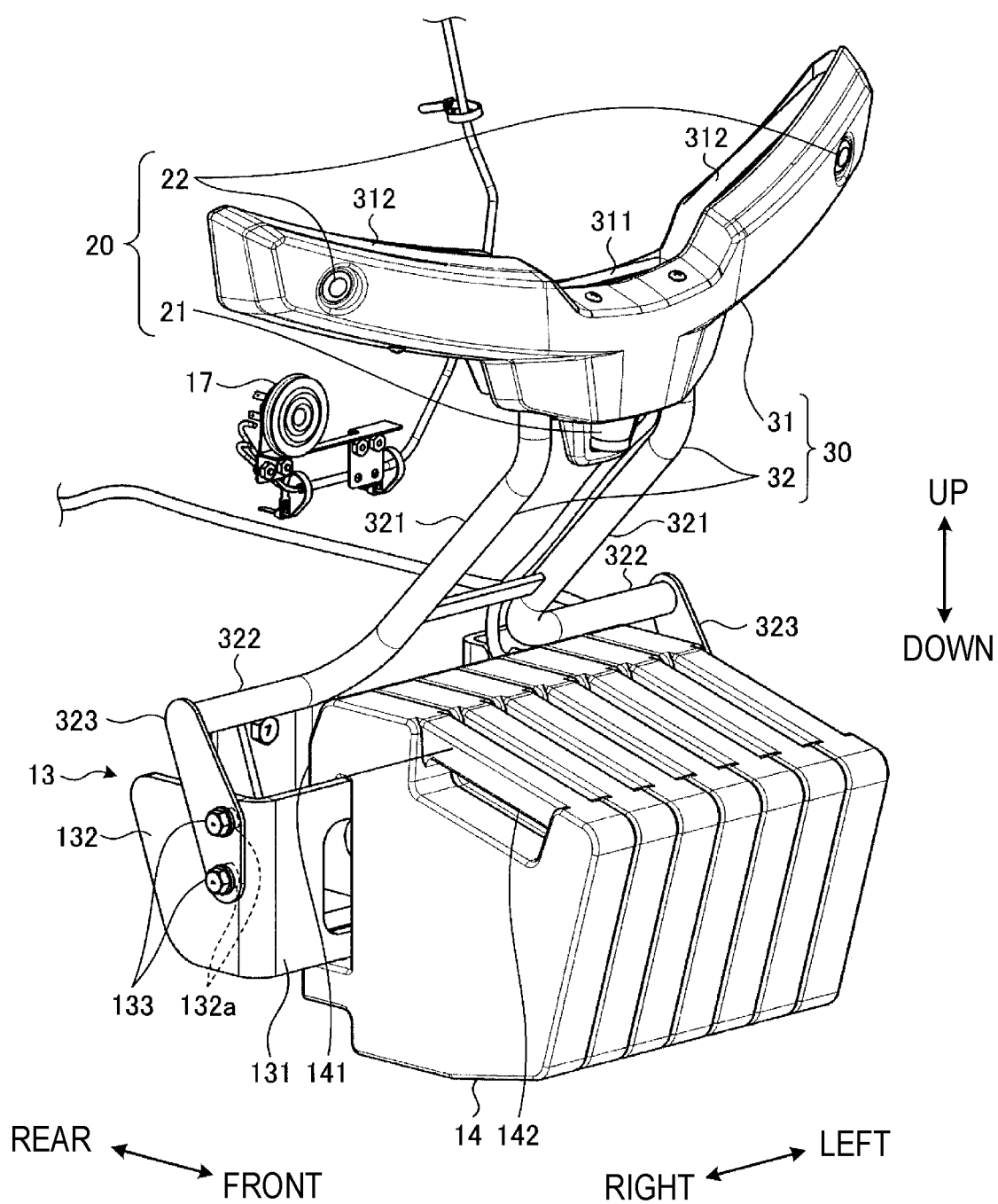
FIG. 4A is a perspective view showing a weight attachment unit, an obstacle sensor and a sensor attaching stay (Part 1).
Figure 4B:
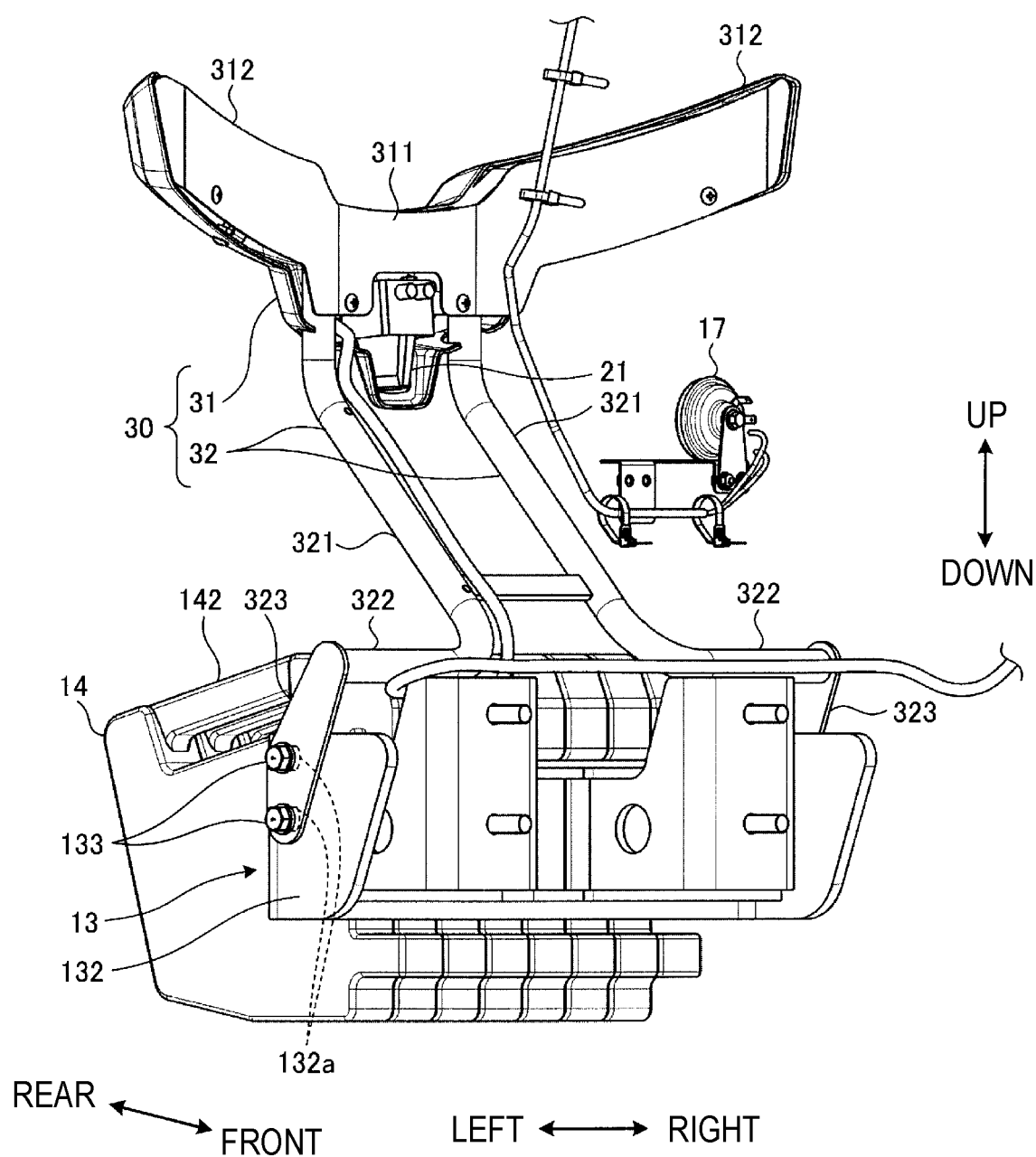
FIG. 4B is a perspective view showing the weight attachment unit, the obstacle sensor and the sensor attaching stay (Part 2).

Next, the weight attachment unit 13 will be described with reference to FIGS. 2, 3, 4A and 4B. FIG. 2 is a left side view showing the front portion of the travelling vehicle body 2. FIG. 3 is a perspective view showing the front portion of the travelling vehicle body 2. FIGS. 4A and 4B are perspective views showing the weight attachment unit 13, the obstacle sensor 20 and the sensor attaching stay 30. The weight attachment unit 13 is configured to allow the weight 14 to be attached thereto and thus to hold the weight 14 on the front portion of the travelling vehicle body 2.

As shown in FIGS. 2 to 4B, the weight attachment unit 13 is a plate-shaped member and is bent at both end portions to have a U shape as viewed in a plan view. For example, the weight attachment unit 13 has a front surface 131 and left and right side surfaces 132. The front surface 131 of the weight attachment unit 13 functions as a holding portion configured to allow a hook portion 141 (as described below) of the weight 14 to be hooked thereon and thus to hold the weight 14.

The left and right side surfaces 132 function as a support portion configured to allow a stay portion 32 (as described below) of the sensor attaching stay 30 to be attached thereto and thus to support the sensor attaching stay 30. Each of the left and right side surfaces 132 has tapped holes 132a formed therein (see FIGS. 4A and 4B). Fastening member 133 may include bolts, etc. (see FIGS. 4A and 4B) that are screwed into the tapped holes 132a. The sensor attaching stay 30 is fixed by screwing the fastening member 133 into the tapped holes 132a. The tapped holes 132a may be formed in the left and right side surfaces 132 of the weight attachment unit 13, and the sensor attaching stay 30 may be attached to the weight attachment unit 13 using the tapped holes 132a. As a result, post-attachment of the sensor attaching stay 30 is possible. For example, the sensor attaching stay 30 may be attached to the tractor 1 after assembly of other components of the tractor 1.

The weight 14 is a flat rectangular block-shaped weight. The weight 14 has a hook portion 141 and a handle portion 142. The hook portion 141 is formed in a hook shape on one side of the weight 14. The hook portion 141 is configured to hook on the front surface 131 of the weight attachment unit 13. The handle portion 142 is formed on a side of the weight 14 different from a side on which the hook portion 141 is formed.

Also, a plurality of weights 14 can be attached side by side, for example, in the left and right direction. The weight 14 is configured to balance front and rear weights of the tractor 1 as described above, such as to prevent the front portion of the machine body from being lifted due to a weight of the work machine W (see FIG. 1) or a work load. In addition, the number of weights 14 can be changed such that a weight thereof is suitable for the weight of the work machine W or the work load.

Obstacle Sensor 20 and Sensor Attaching Stay 30.

Next, the obstacle sensor 20 and the sensor attaching stay 30 will be described with reference to FIGS. 2, 3, 4A and 4B. As shown in FIGS. 2 to 4B, the obstacle sensor 20 includes a first sensor 21 and a second sensor 22. The first sensor 21 and the second sensor 22 are different from each other in type. The first sensor 21 is a medium distance sensor and the second sensor 22 is a short distance sensor. In the present embodiment, the first sensor 21 is an infrared sensor and the second sensor 22 is an ultrasonic sensor. The second sensor 22 may be configured to detect an obstacle at a distance from the work vehicle 1 shorter than that of the first sensor 21. A detection range of the second sensor 22 may be shorter than a detection range of the first sensor 21.

The first sensor 21, which may be an infrared sensor, is configured to emit an infrared beam and then to receive a reflected beam from an obstacle. The first sensor 21 can detect a distance to the obstacle, for example, by measuring a time until the reflected beam from the obstacle is detected after emitting the infrared beam. The first sensor 21, which may be an infrared sensor, detects the obstacle two-dimensionally and has, for example, a detection range of several meters to several tens of meters. Alternatively, any medium distance sensors other than an infrared sensor may be used as the first sensor 21.

The second sensor 22, which may be an ultrasonic sensor, is configured to emit ultrasonic waves and then to receive reflected waves from the obstacle. The second sensor 22 can detect presence of the obstacle by receiving the reflected waves from the obstacle. The second sensor 22, which may be an ultrasonic sensor, has, for example, a detection range of several meters. Alternatively, any short distance sensors other than an ultrasonic sensor may be used as the second sensor 22.

Also, the second sensor 22 may include two sensors arranged symmetrically with respect to the left and right direction on the basis of a location where the first sensor 21 is attached. As a result, the detection range of the obstacle sensor 20 (first sensor 21 and second sensors 22) can be expanded.

Meanwhile, the obstacle includes, for example, a levee of a farm field, a wall near to the field levee, a work assistant in the field, a person such as a child who has entered the field, and a farm tool in the field.

As shown in FIGS. 4A and 4B, the sensor attaching stay 30 includes a bracket portion 31 and left and right stay portions 32. The bracket portion 31 is configured to hold the first sensor 21 and the second sensors 22. The bracket portion 31 is formed of, for example, resin and has a body portion 311 and left and right arm portions 312. In addition, the first sensor 21 is attached to a lower surface of the body portion 311. Each of the left and right arm portions 312 is provided to extend from the body portion 311 in the left and right direction. Each of the second sensors 22 is attached to respective front surfaces of the left and right arm portions 312.

The bracket portion 31 holds the first sensor 21 on the body portion 311 in such a manner that the first sensor 21 can be pivoted in a pitching direction, of which a pivot axis corresponds to the left and right direction. As a result, it is possible to adjust an angle of the first sensor 21 and thus to absorb (e.g., correct) an attaching error of the first sensor 21.

The left and right stay portions 32 extend upward from the weight attachment unit 13 in an attached state of the sensor attaching stay 30 thereon, so that the bracket portion 31 is positioned in front of the bonnet 6 and also above the weight 14. Each of the left and right stay portions 32 is formed of, for example, metal and has an extension portion 321, a bent portion 322 and a base end portion 323. The extension portion 321 is formed, for example, in the shape of a pipe. The extension portion 321 extends upward. The bracket portion 31 is attached to a distal end of the extension portion 321.

The bent portion 322 is formed, for example, in the shape of a pipe continuous from the extension portion 321. The bent portion 322 is formed to be bent from the extension portion 321 outwardly in the left and right direction. The base end portion 323 is formed, for example, in the shape of a plate. The base end portion 323 is provided on a base end of the bent portion 322. The base end portion 323 has a hole (not shown) allowing the fastening member 133, which is to be screwed into the tapped hole 132a of the weight attachment unit 13, to be inserted therethrough. Each of left and right base end portions 323 is attached to respective left and right side surfaces 132 of the weight attachment unit 13 by the fastening member 133.

The sensor attaching stay 30 is configured to position the first sensor 21, which may be an infrared sensor, at the center of the travelling vehicle body 2 and also above an illumination range of front lights 15 as viewed in a front view of the machine body. As a result, it is possible to position the first sensor 21 while securing the illumination range of the front lights 15.

Further, the stay portions 32 of the sensor attaching stay 30 extend between the right and left front lights 15 (see FIGS. 2 and 3) as viewed in the front view of the machine body. As a result, it is possible to position the first sensor 21 while securing the illumination range of the front lights 15.

In addition, the first sensor 21 is positioned at a location where the weight 14 attached to the weight attachment unit 13 does not interfere with the infrared emitting plane thereof. Therefore, the weight 14 can be used even while the first sensor 21 is attached, so that the work machine W can be used when required to carry the weight 14, which expands the range of use of the work machine W.

Also, a vertical distance between the weight attachment unit 13 and the first sensor 21 and thus the sensor attaching stay 30 may be set to a predetermined amount or more. For example, the vertical distance may be set to be at least twice a minimum distance. The minimum distance may refer to a distance which allows the weight 14 to be lifted upward and removed from the weight attachment unit 13. As a result, it is possible to attach or remove the weight 14 even while the first sensor 21 has been attached, thereby expanding a range of applicable work machines W.

Further, the first sensor 21 and the sensor attaching stay 30 are positioned at a location where they do not interfere with the bonnet 6 when the bonnet 6 is pivoted (e.g., opened or closed). As a result, it is possible to open or close the bonnet 6 while the first sensor 21 has been attached. In addition, since the first sensor 21 is spaced from the bonnet 6, it is possible to attach the first sensor 21 while securing an intake air amount through a front grill 16 and also to inhibit a sound volume of a horn 17 from being reduced more than necessary.

Further, the first sensor 21 may be positioned low with respect to the ground. As a result, the first sensor 21 may emit an infrared beam from a lower location, so that a forward detection distance by the first sensor 21 can be increased.

Further, the first sensor 21 may be attached in such a manner that an angle between the infrared emitting plane and the ground surface is minimized. As a result, the infrared beam emitted from the first sensor 21 further approaches horizontal, so that an obstacle present in the rear of the first sensor 21 can be detected.

Also, the sensor attaching stay 30 is configured to position the second sensors 22, which may be ultrasonic sensors, between the front lights 15 and LED work lights 18 provided on an upper portion of the bonnet 6, as viewed in the front view of the machine body. As a result, it is possible to position the second sensors 22 while securing the illumination range of the front lights 15 and the LED work lights 18.

Further, the second sensors 22 and the sensor attaching stay 30 are positioned at a location where they do not interfere with the bonnet 6 when the bonnet 6 is pivoted (e.g., opened or closed). As a result, it is possible to open or close the bonnet 6 while the second sensors 22 have been attached. In addition, the second sensors 22 may be spaced from the bonnet 6, and it may be possible to attach the second sensors 22 while securing an intake air amount through the front grill 16 and also to inhibit a sound volume of the horn 17 from being reduced more than necessary.

Further, the second sensors 22 are positioned above the infrared emitting plane of the first sensor 21 in the vertical direction. As a result, the second sensors 22 can be positioned at a location where the second sensors 22 do not block an infrared beam emitted from the first sensor 21, thereby allowing the detection range of the first sensor 21 to be expanded to the rear of the first sensor 21.

In addition, the second sensors 22 are positioned at locations where the weight 14 attached to the weight attachment unit 13 does not interfere with the detection range thereof, e.g., the range of ultrasonic waves. Therefore, the weight 14 can be used even while the second sensors 22 are attached, so that the work machine W can be used when required to carry the weight 14, which expands the range of use of the work machine W.

Also, the second sensors 22 are preferably positioned in the rear of the first sensor 21 in the front and rear direction.

As a result, an obstacle, which exists below the infrared emitting plane and thus may not be detected by the first sensor 21, can be detected by the second sensors 22.

Further, the second sensors 22 are positioned offset from the first sensor 21 in the left and right direction. For example, if the second sensors 22 are positioned directly above the first sensor 21, the detection range (e.g., a range of infrared beams) of the first sensor 21 falls within the detection range (e.g., a range of ultrasonic waves) of the second sensors 22. Therefore, it is necessary to further space two sensors 21, 22 from each other. However, by offsetting the second sensors 22 from the first sensor 21 in the left and right direction, a distance between the first sensor 21 and the second sensors 22 can be shortened.

Obstacle Detection Control.

Figure 5:
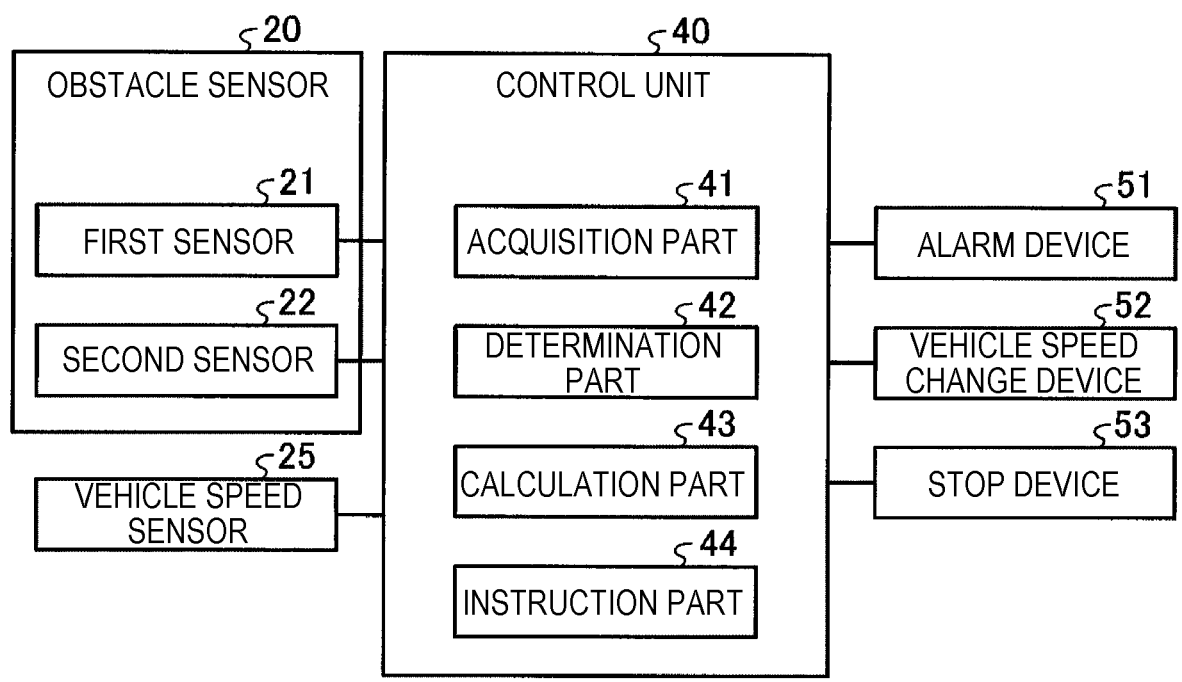
FIG. 5 is a block diagram showing an example of a control system including detecting an obstacle.

Next, a control system that may be used, for example, for detecting an obstacle will be described with reference to FIG. 5. FIG. 5 is a block diagram showing an example of a control system configured to detect an obstacle. As shown in FIG. 5, the control system includes the obstacle sensor 20 (first sensor 21 and second sensors 22) and a control unit 40. The control system may include the tractor 1.

As described above, the first sensor 21, which may be an infrared sensor, is a sensor (e.g., a medium distance sensor) having a detection range wider than that of the second sensors 22. The first sensor 21 is configured to output a detected signal to the control unit 40. Also, as described above, the second sensors 22, which may be ultrasonic sensors, are sensors (e.g., short distance sensors) having a detection range narrower than that of the first sensor 21. The second sensors 22 are configured to output a detected signal to the control unit 40.

The control unit 40 is configured to control the entire tractor 1. The control unit 40 includes an acquisition part 41, a determination part 42, a calculation part 43 and an instruction part 44. Meanwhile, the control unit 40 is a computer including a processor such as a processing unit (CPU) for controlling computing processes and operations of various devices, a storage device (memory) for storing programs and data therein, and an input/output interface.

The acquisition part 41 is configured to acquire information from various devices connected to the control unit 40. The acquisition part 41 acquires detection range information of each of the first sensor 21 and the second sensors 22. The acquisition part 41 acquires a detected signal from each of the first sensor 21 and the second sensors 22.

The determination part 42 is configured to execute determination processes. The determination part 42 includes a storage device for storing therein data used to execute the determination processes. The determination part 42 is configured to determine presence of an obstacle based on presence of a detected signal from the first sensor 21 and also to determine presence of an obstacle based on presence of a detected signal from the second sensors 22.

The calculation part 43 is configured to calculate a distance from, for example, the travelling vehicle body 2 (see FIG. 1) to an obstacle. For example, the calculation part 43 calculates a distance from the travelling vehicle body 2 to the obstacle based on the detected signal from the first sensor 21, which may be an infrared sensor, and a vehicle speed detected by a vehicle speed sensor 25.

The instruction part 44 is configured to instruct the travelling vehicle body 2 to perform, for example, risk avoidance, based on a determination result, which is determined with respect to presence of an obstacle by the determination part 42, and a distance, which is calculated by the calculation part 43.

In addition, when a distance to an obstacle has been detected by the first sensor 21, the instruction part 44 may instruct the travelling vehicle body 2 to perform different risk avoidance depending on the distance to the obstacle. Herein, the tractor 1 includes, for example, an alarm device 51, a vehicle speed change device 52 and a stop device 53. The instruction part 44 may issue commands based on the distance to the obstacle and one or more thresholds. Among the thresholds, a first threshold may be nearest to the travelling vehicle body 2, a second threshold may be more remote from the travelling vehicle body 2, and a third threshold may be most remove from the travelling vehicle body 2. The instruction part 44 instructs the alarm device 51 to generate an alarm if the obstacle is at the remotest distance from the travelling vehicle body 2 (or tractor 1), instructs the vehicle speed change device 52 to reduce a vehicle speed if the obstacle is at the next remotest distance from the travelling vehicle body 2, and instructs the stop device 53 to stop the travelling vehicle body 2 if the obstacle is at the nearest distance from the travelling vehicle body 2.

Detection Range of First Sensor 21.

Figure 6:
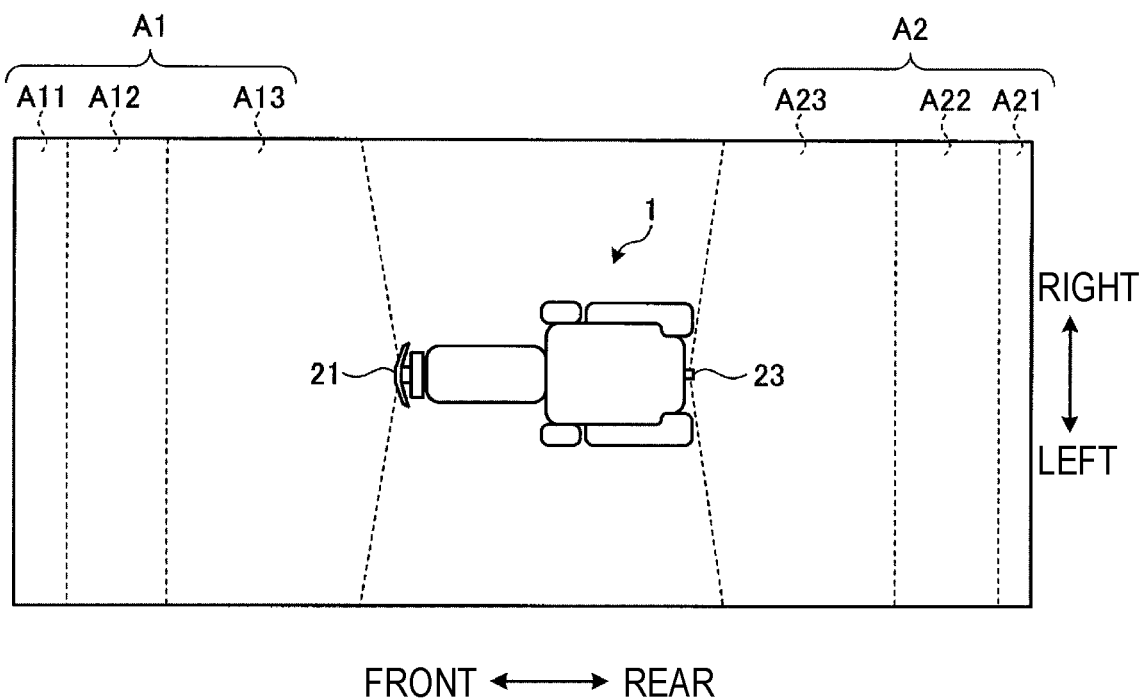
FIG. 6 is an explanatory view of a detection range by a first sensor.

Next, the detection range of the first sensor 21 will be described with reference to FIG. 6. FIG. 6 is an explanatory view (e.g., a schematic view) of the detection range of the first sensor 21, which is a plan view showing the detection range of the first sensor 21. As shown in FIG. 6, the first sensor 21, which may be an infrared sensor, emits an infrared beam toward the front side of the machine body.

The detection range A1 of the first sensor 21 may be divided into a plurality of ranges (e.g., three ranges), for example, along the front and rear direction. Herein, the detection range of the first sensor 21 is divided into a detection range A11, which is at the remotest distance from the tractor 1, a detection range A12, which is at the next remotest distance from the tractor 1, and a detection range A13, which is at the nearest distance from the tractor 1.

Then, as described above, the tractor 1 performs different risk avoidance depending on a distance to an obstacle, such as, for example, generating an alarm if the obstacle is within the remotest detection range A11, for example, reducing a vehicle speed if the obstacle is within the next remotest detection range A12, and for example, stopping if the obstacle is within the nearest detection range A13.

Also, the tractor 1 may have a third sensor 23 that detects the rear side of the machine body. The third sensor 23 is positioned, for example, on an upper portion of the cabin 7a (see FIG. 1). Also, the third sensor 23 may be an infrared sensor similar to the first sensor 21 and may have a plurality of detection ranges (e.g., three detection ranges) divided along the front and rear direction, like the first sensor 21. In this case, the detection range of the third sensor 23 is also divided into a detection range A21, which is at the remotest distance from the tractor 1, a detection range A22, which is at the next remotest distance from the tractor 1, and a detection range A23, which is at the nearest distance from the tractor 1.

Detection Range of Second Sensor 22.

Figure 7A:
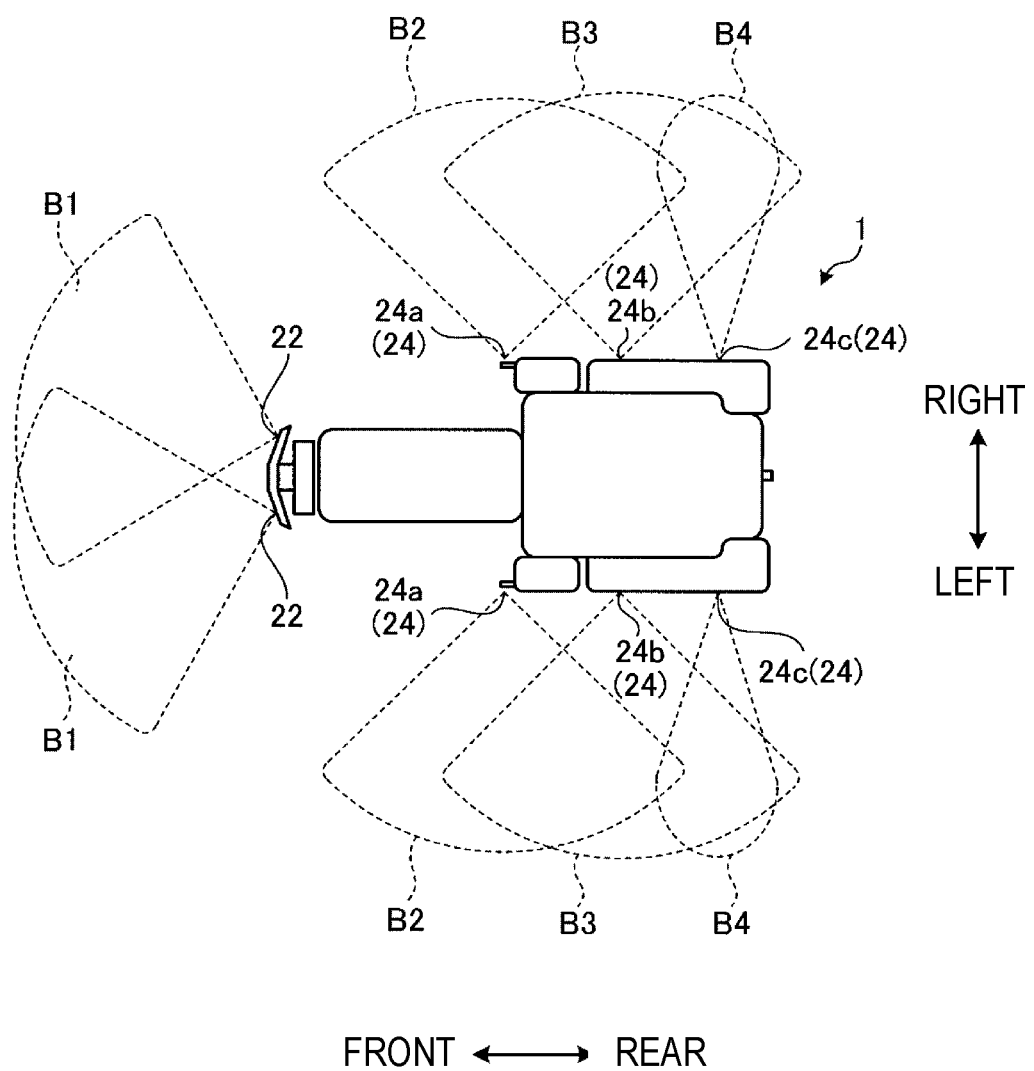
FIG. 7A is an explanatory view of a detection range by a second sensor (Part 1).
Figure 7B:
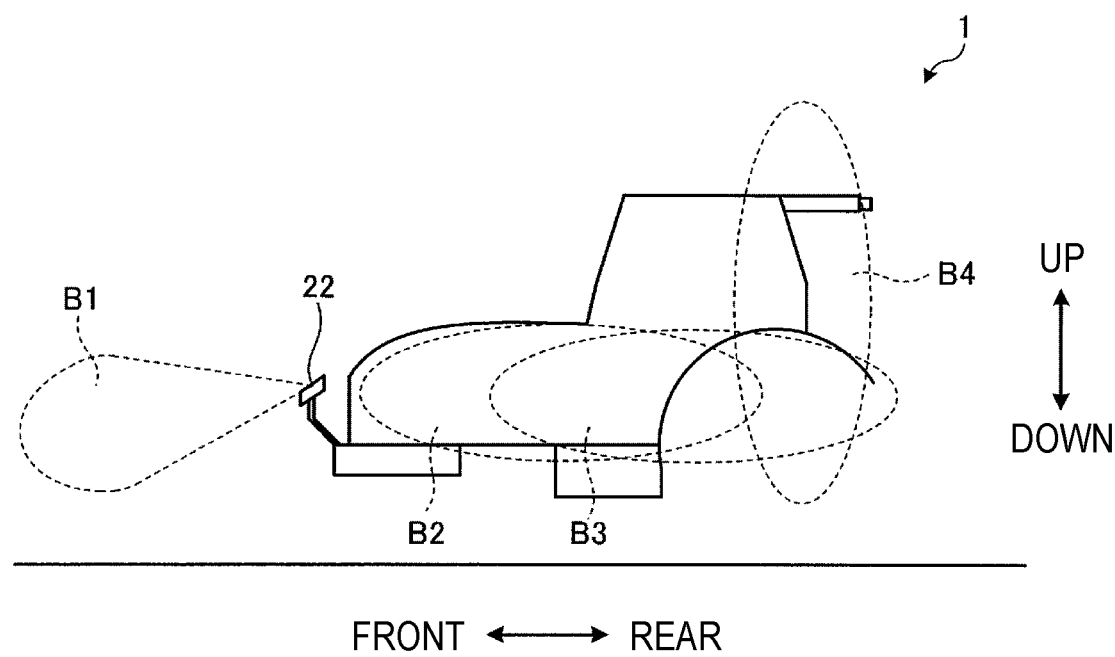
FIG. 7B is an explanatory view of the detection range by the second sensor (Part 2).
Figure 7C:
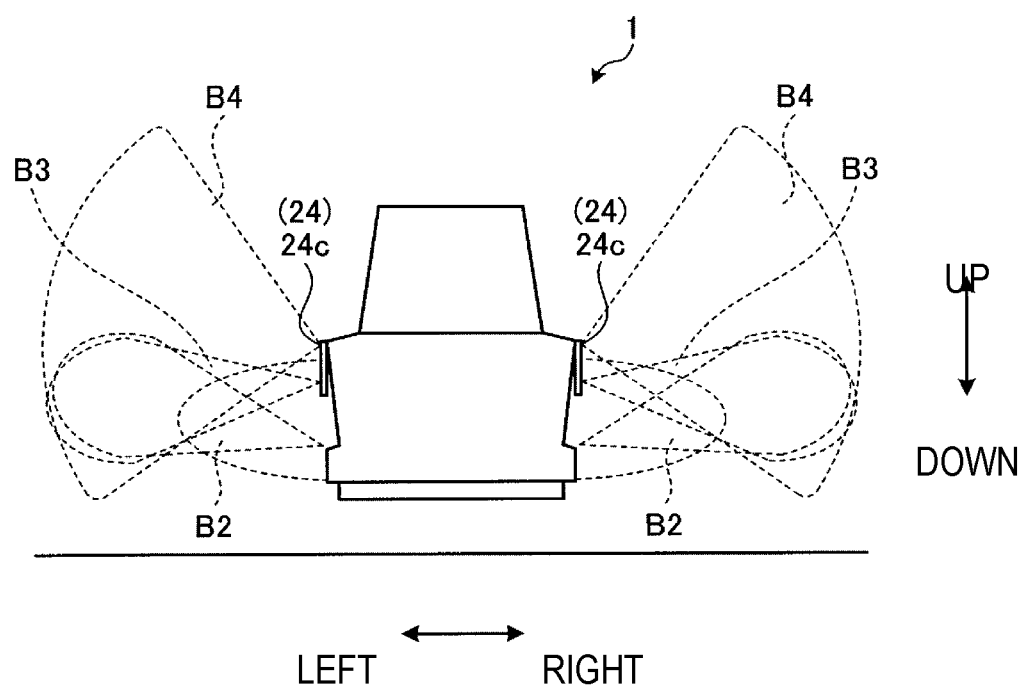
FIG. 7C is an explanatory view of the detection range by the second sensor (Part 3).

Next, the detection range of the second sensors 22 will be described with reference to FIGS. 7A, 7B and 7C. FIGS. 7A to 7C are explanatory views (e.g., schematic views) of the detection range of the second sensors 22, in which FIG. 7A is a plan view showing the detection range of the second sensors 22, FIG. 7B is a left side view showing the detection range of the second sensors 22, and FIG. 7C is a rear view showing the detection range of the second sensors 22.

As shown in FIGS. 7A and 7B, each of two second sensors 22, which may be ultrasonic sensors and arranged in the left and right direction, emits ultrasonic waves toward the front side of the machine body. As viewed in the plan view of the machine body, the detection range B1 of the second sensors 22 has a pattern of spreading in a fan shape toward the front side. As viewed in the side view of the machine body, the detection range B1 of the second sensors 22 has a pattern of spreading in a conical shape toward the front side. As viewed in the rear view of the machine body, the detection range B1 of the second sensors 22 has a pattern of spreading in an elliptical shape in the left and right direction.

Also, as shown in FIGS. 7A to 7C, the tractor 1 may have a fourth sensor 24. The fourth sensor 24 may be an ultrasonic sensor similar to the second sensors 22 and is attached, for example, at a plurality of locations on each of left and right side surfaces of the travelling vehicle body 2 of the tractor 1 (see FIG. 1). In the depicted example, three of the fourth sensors 24 (sensor 24a, sensor 24b and sensor 24c) are arranged from front to rear on each of the left and right side surfaces, as viewed in the plan view of the machine body. Among these, the rearmost sensor 24c is positioned on the upper portion of the cabin 7a (see FIG. 1).

Of the fourth sensors 24, both detection ranges B2, B3 of the sensor 24a and the sensor 24b have a pattern of spreading in a fan shape toward a corresponding side of left and right sides as viewed in the plan view of the machine body, have a pattern of spreading in an elliptical shape in the front and rear direction as viewed in the side view of the machine body, and have a pattern of spreading in a conical shape toward a corresponding side of left and right sides as viewed in the rear view of the machine body.

Also, a detection range B4 of the rearmost sensor 24c of the fourth sensors 24 has a pattern of spreading in a conical shape toward a corresponding side of left and right sides as viewed in the plan view of the machine body, has a pattern of spreading in an elliptical shape from upper to lower as viewed in the side view of the machine body, and has a pattern of spreading in a fan shape toward a corresponding side of left and right sides as viewed in the rear view of the machine body. Meanwhile, since the detection range B4 of the rearmost sensor 24c has a pattern of spreading in an elliptical shape from upper to lower as viewed in the side view of the machine body, it is possible to prevent the work machine W (see FIG. 1), which is arranged on the rear of the travelling vehicle body 2, from being detected as an obstacle. Therefore, a misdetection can be prevented.

According to the embodiments as described above, the obstacle sensor 20 (which may include first sensor 21 and second sensors 22) can detect an obstacle while avoiding the weight 14 arranged on the front end of the travelling vehicle body 2 and thus is not disturbed by the weight 14. Therefore, the obstacle sensor 20 can detect an obstacle in front of the travelling vehicle body 2 over a wide range in the upward and downward direction. As a result, the obstacle detection accuracy can be improved.

Also, the obstacle sensor 20 (e.g., including first sensor 21 and the second sensors 22) is not directly attached to the bonnet 6, but attached to the sensor attaching stay 30 attached to the weight attachment unit 13. Therefore, the obstacle sensor 20 is hardly influenced by vibration of the bonnet 6. As a result, the obstacle detection accuracy can be improved.

Further, the obstacle sensor 20 can detect a distance to an obstacle using the first sensor 21, which may be an infrared sensor, and also detect presence of an obstacle, which exists at a close location, using the second sensors 22, which may be ultrasonic sensors. As a result, the obstacle detection accuracy can be improved.

Meanwhile, although in the foregoing embodiments, the infrared sensor is used as the first sensor 21 or the third sensor 23, for example, a radar sensor which emits radio waves and then detects an obstacle, may be used as the first sensor 21 or the third sensor 23. The radar sensor detects an obstacle three-dimensionally and has, for example, a detection range of several meters to several hundreds of meters.

Further effects and variants can be easily derived by those skilled in the art. Therefore, broader aspects of the present invention are not limited to the specific details and representative embodiments as shown and described above. Accordingly, various modifications can be made without departing from the spirit or scope of the general inventive concept as may be defined by the appended claims and equivalents thereof.

REFERENCE SIGNS LIST

1: Work vehicle (tractor)
2: Travelling vehicle body
3: Vehicle body frame
4: Front wheel
5: Rear wheel
6: Bonnet
7: Cockpit
7A: Cabin
8: Operator seat
9: Steering wheel
10: Transmission case
11: PTO shaft
12: Front bumper
13: Weight attachment unit
131: Front surface
132: Side surface
132a: Tapped hole
133: Fastening member
14: Weight
141: Hook portion
142: Handle portion
15: Front light
16: Front grill
17: Horn
18: LED work light
20: Obstacle sensor
21: First sensor (infrared sensor)
22: Second sensor (ultrasonic sensor)
23: Third sensor (infrared sensor)
24: Fourth sensor (ultrasonic sensor)
25: Vehicle speed sensor
30: Sensor attaching stay
31: Bracket portion
311: Body portion
312: Arm portion
32: Stay portion
321: Extension portion
322: Bent portion
323: Base end portion
40: Control Unit
41: Acquisition part
42: Determination part
43: Calculation part
44: Instruction part
51: Alarm device
52: Vehicle speed change device
53: Stop device
A1: Detection range of the first sensor
B1: Detection range of the second sensor
E: Engine
W: Work machine

What is claimed is:

1. A work vehicle, comprising:
a bonnet provided on a front portion of a travelling vehicle body;
an obstacle sensor configured to detect an obstacle on a front side of the work vehicle; and
a sensor attaching stay configured to extend toward a front side of the bonnet and to allow the obstacle sensor to be attached thereto,
wherein the sensor attaching stay comprises a bracket portion having arm portions extending in a left and right direction,
the obstacle sensor is provided on each of a left arm portion and a right arm portion of the arm portions,
the bracket portion includes a body portion at a center portion in the left and right direction and includes the arm portions extending from the body portion in the left and right direction, and
the obstacle sensor includes a first sensor, providing on the body portion, configured to detect an obstacle, and a second sensor, provided on each of the arm portions, configured to detect an obstacle at a distance from the work vehicle shorter than a detection range of the first sensor.

2. The work vehicle according to claim 1, wherein
the first sensor is an infrared sensor configured to detect an obstacle by applying an infrared beam, and
the second sensor is an ultrasonic sensor configured to detect an obstacle by emitting ultrasonic waves.

3. The work vehicle according to claim 1, wherein
a weight attachment unit is provided on the front portion of the travelling vehicle body and configured such that a weight can be attached thereto in order to maintain a weight balance of the vehicle body, and
the obstacle sensor is positioned above the weight.

4. The work vehicle according to claim 1, wherein
a weight attachment unit is provided on the front portion of the travelling vehicle body and configured such that a weight can be attached thereto in order to maintain a weight balance of the vehicle body, and
the obstacle sensor is positioned in front of a rear end of the weight.

5. The work vehicle according to claim 4, wherein the weight attachment unit is configured such that a vertical distance between the weight attachment unit and the first sensor is set to at least a predetermined amount.

6. The work vehicle according to claim 5, wherein the vertical distance is set to be at least twice a minimum distance, wherein the minimum distance corresponds to a distance which allows the weight to be lifted upward and removed from the weight attachment unit.

7. The work vehicle according to claim 3, wherein the obstacle sensor is positioned in front of a rear end of the weight.

8. A work vehicle, comprising:
a bonnet provided on a front portion of a travelling vehicle body;
an obstacle sensor configured to detect an obstacle in front of the bonnet;
a weight attachment unit provided on the front portion of the travelling vehicle body, the weight attachment unit configured to accommodate a weight for balancing front and rear weights of the work vehicle; and a sensor attaching stay attached to the weight attachment unit, wherein the sensor attaching stay is configured to extend in front of the bonnet and above the weight attachment unit, and to accommodate the obstacle sensor thereon such that the obstacle sensor can be positioned in front of a rear end of the weight.

9. The work vehicle of claim 8, wherein the sensor attaching stay is configured to accommodate the obstacle sensor thereon such that obstacle sensor can be positioned above the weight.

10. The work vehicle of claim 8, wherein the sensor attaching stay includes a bracket portion having
a body portion at a center portion in a lateral direction and an arm portion extending from the body portion in the lateral direction, and the obstacle sensor includes:
a first sensor configured to detect an obstacle provided on the body portion, and
a second sensor configured to detect an obstacle at a distance from the work vehicle shorter than a detection range of the first sensor, the second sensor provided on the arm portion.

11. The work vehicle of claim 10, wherein the sensor attaching stay includes a plurality of arm portions extending from the body portion in the lateral direction, and the second sensor includes a plurality of sensors, each provided on one of the plurality of arm portions.

* * * * *